Aug. 19, 1958

R. C. RISNER 2,848,270

AUTOMOBILE CARRIERS

Filed March 1, 1955

INVENTOR
R. C. RISNER

BY Ogle R. Singleton

ATTORNEY

Aug. 19, 1958   R. C. RISNER   2,848,270
AUTOMOBILE CARRIERS
Filed March 1, 1955   2 Sheets-Sheet 2

INVENTOR
R. C. RISNER

BY Ogle R. Singleton

ATTORNEY

United States Patent Office 2,848,270
Patented Aug. 19, 1958

2,848,270

AUTOMOBILE CARRIERS

Robert C. Risner, Baltimore, Md.

Application March 1, 1955, Serial No. 491,391

2 Claims. (Cl. 296—1)

My invention consists in a new and useful improvement in automobile carriers and constitutes an improvement of the carrier described and claimed in U . S. Patent Number 2,766,898 granted to me on October 16, 1956.

I have found by experience that it is desirable to provide the intermediate trackway of the carrier with an auxiliary trackway to afford flexibility to permit variations in length of the intermediate trackway to better adapt it to varied loading conditions.

While I illustrate in the drawings and hereinafter fully describe one specific embodiment of my invention, it is to be distinctly understood that I do not consider my invention to be limited to said specific embodiment, but refer for its scope to the claims appended hereto.

Figure 1:
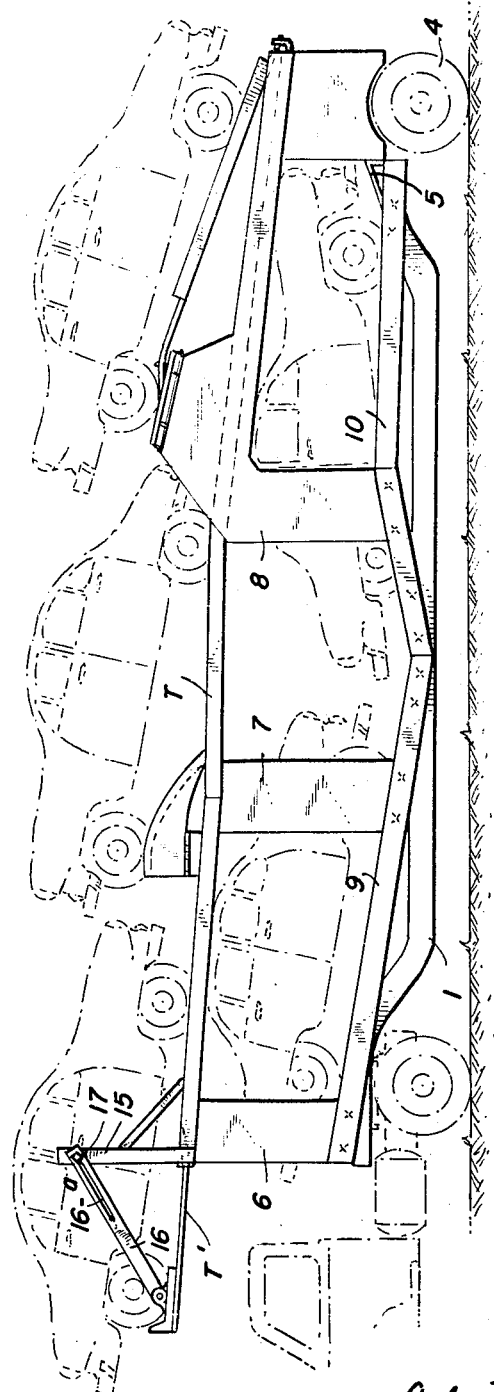
Fig. 1 is a side elevation of my improved trailer fully loaded with five cars shown in broken lines, a portion of the tractor for the trailer being shown in broken lines.
Figure 2:
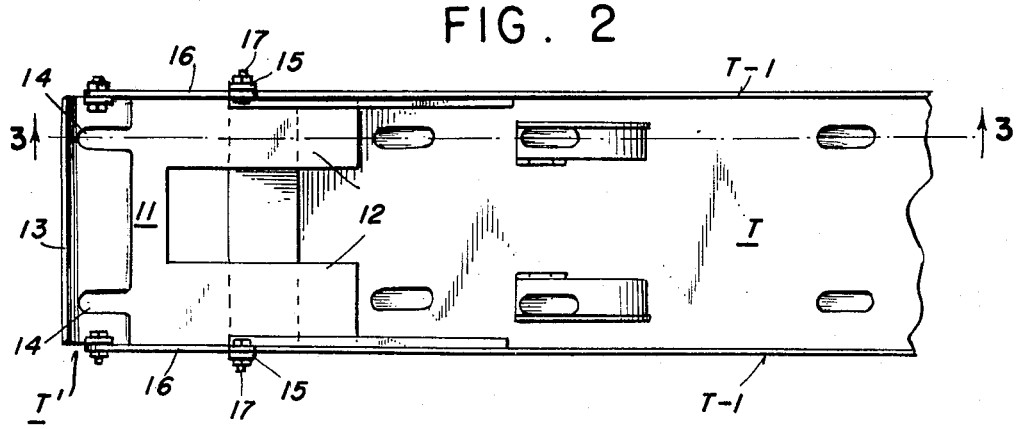
Fig. 2 is a fragmentary top plan of the trailer.

As shown in the drawings, my improved trailer has a base comprising longitudinal side beams 1 and 2 (Figs. 1 and 3) and transverse beams 3 of ordinary channel irons, supported at its rear by ground wheels 4 and at its front by the usual coupling with the tractor. It will be noted that the beams 1 and 2 are so configured that the trailer is underslung between the coupling and the wheels 4. Suitably mounted on the beams 1 and 2 and 3 there is a lower trackway 5. Suitably mounted on the beams 1 and 2 there are two series of pillars 6, 7, 8 and 6', 7', 8', respectively. Longitudinal strengthening ribs 9 and 10 and 9', 10' are provided for the pillars. Suitably mounted on the pillars there is a trackway T having upstanding lateral flanges T–1. On the forward end of the trackway T there is slidably mounted an auxiliary trackway T' which is U-shaped having a head 11 and legs 12 aligned with the trackway T. The head 11 has an upstanding transverse flange 13 and a pair of slots 14 so disposed as to receive therein the rear wheels of a car.

A pair of posts 15 project upwardly from the forward end of the trackway T and a pair of bars 16 are pivoted on the ends of the head 11 of the trackway T' and supported on the posts 15 by bolts 17 passed through slots 16–a in the bars 16 for adjustment of the trackway T' relative the trackway T.

The other features of my improved carrier shown in the drawings of this case are identical with those disclosed in my said U. S. Patent Number 2,766,898.

Having described the details of construction of my improved carrier, I will now describe its use and operation.

When the carrier is to be loaded with five automobiles which have lengths permitting them to be loaded as shown in Fig. 1 of my said U. S. Patent Number 2,766,898, the auxiliary trackway T' is disposed as indicated in broken lines in Fig. 3 of this application, the nuts on the bolts 17 being set up to retain the trackway T' in retracted position.

Figure 3:
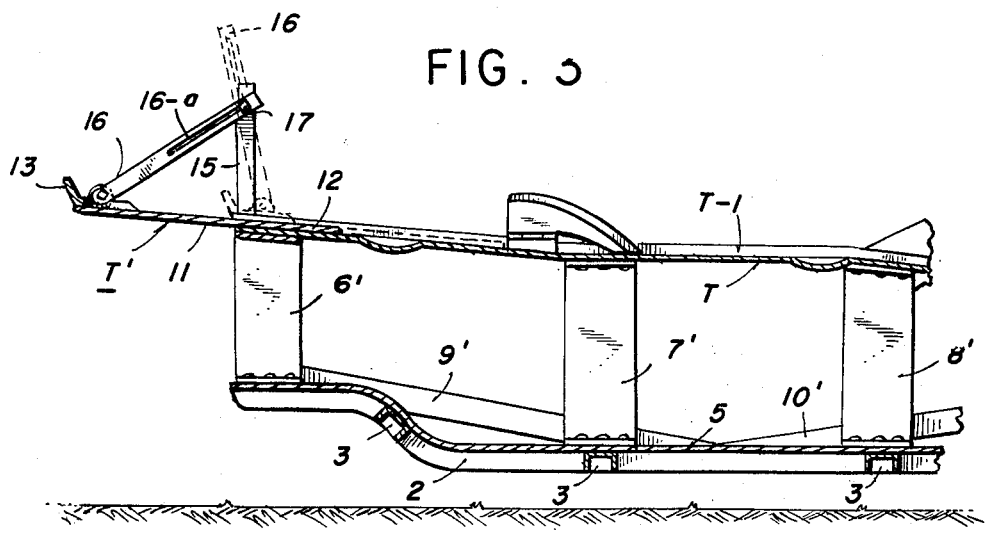
Fig. 3 is a vertical seciton on the line 3—3 of Fig. 2.

When it is desired to load the carrier with cars which have lengths which require greater length of the intermediate trackway T, this can be provided by adjusting the axially slidable auxiliary trackway T' to provide the additional length, the trackway T' being disposed as indicated in solid lines in Fig. 3.

It is obvious that the trackway T' can be disposed at selected positions relative to the intermediate trackway T, according to the additional length desired, and that this auxiliary trackway T' provides means for conditioning the carrier to provide space on the intermediate trackway T for loading vehicles, such as trucks and busses, having considerably greater length than ordinary passenger cars.

Having described my invention, what I claim is:

1. In a vehicle for carrying automobiles, the combination of a fixed lower trackway; a fixed intermediate trackway; a removable upper trackway; and an auxiliary trackway slidably mounted on the forward end of said intermediate trackway, and adapted to elongate said intermediate trackway, said auxiliary trackway comprising a U-shaped plate having on its bight an upstanding transverse flange, and a pair of legs extending longitudinally of said intermediate trackway to provide tracks for the automobile wheels.

2. In a vehicle for carrying automobiles, the combination of a fixed lower trackway; a fixed intermediate trackway; a removable upper trackway; an auxiliary trackway slidably mounted on the forward end of said intermediate trackway, and adapted to elongate said intermediate trackway; a pair of upstanding posts at the forward end of said intermediate trackway; a pair of bars hinged on the sides of the outer end of said auxiliary trackway and having longitudinal slots at their outer end portions; and a pair of bolts passed through said slots, respectively, and removably pivoted on the upper ends of said posts, respectively.

References Cited in the file of this patent

UNITED STATES PATENTS

| 1,894,534 | Dolan | Jan. 17, 1933 |
| 2,451,284 | Garnett | Oct. 12, 1948 |
| 2,521,088 | Phelps | Sept. 5, 1950 |
| 2,694,597 | Kunz | Nov. 16, 1954 |
| 2,766,898 | Risner | Oct. 16, 1956 |